United States Patent
Masterson

(10) Patent No.: US 7,272,953 B2
(45) Date of Patent: *Sep. 25, 2007

(54) METHOD AND APPARATUS FOR SEPARATING AND NEUTRALIZING AMMONIA

(76) Inventor: James A. Masterson, 8109 Pine Castle Dr., Louisville, KY (US) 40219

( * ) Notice: Subject to any disclaimer, the term of this patent is extended or adjusted under 35 U.S.C. 154(b) by 392 days.

This patent is subject to a terminal disclaimer.

(21) Appl. No.: 10/875,053

(22) Filed: Jun. 23, 2004

(65) Prior Publication Data

US 2004/0226302 A1 Nov. 18, 2004

Related U.S. Application Data

(63) Continuation-in-part of application No. 10/338,504, filed on Jan. 8, 2003, now Pat. No. 6,755,029.

(60) Provisional application No. 60/346,549, filed on Jan. 8, 2002.

(51) Int. Cl.
*F25B 43/00* (2006.01)
*F25B 43/02* (2006.01)

(52) U.S. Cl. ............................. 62/474; 62/84; 62/468; 62/195

(58) Field of Classification Search .................. 62/474, 62/468, 84, 193, 471; 423/356
See application file for complete search history.

(56) References Cited

U.S. PATENT DOCUMENTS 1,836,318 A 12/1931 Gay (Continued)

OTHER PUBLICATIONS

IIAR (International Institute of Ammonia Refrigeration); Good Practices for the Operation of an Ammonia Refrigeration System; Bulletin No. R1 1983; all pages; Arlington VA,US.

(Continued)

*Primary Examiner*—Chen-Wen Jiang
(74) *Attorney, Agent, or Firm*—Waters Law Office; Robert R. Waters; Brian W. Foxworthy

(57) ABSTRACT

The present invention is a method and apparatus to provide for the safe and effective removal and neutralization of ammonia from a stream of waste oil or other liquid. The apparatus consists of a receiving tank, a treatment tank, circulation piping, associated controls, pumping and monitoring mechanisms. The primary utility for the invention is with commercial and industrial refrigeration units. The neutralizing solution in the treatment tank is circulated through the piping which includes a venturi that is used to induce a negative gauge pressure in the receiving tank by creating a suction that draws gases from the receiving tank. The negative pressure allows the receiving tank to pull the mixture of waste oil and entrained ammonia from the drain port of the refrigeration system even when the system is below atmospheric pressure. The venturi also removes ammonia gas from the receiving tank. The system provides for the introduction of a neutralizing agent such as carbon dioxide to be mixed with liberated ammonia as it is drawn into the circulation piping and returned to the treatment tank. Other paths in the circulation piping pass the neutralizing solution through a heat exchanger in the receiving tank or just return it to the treatment tank for mixing. Heat transfer cools the treatment tank and heats the receiving tank which facilitates evaporation of liquid ammonia.

22 Claims, 3 Drawing Sheets

U.S. PATENT DOCUMENTS

| | | |
|---|---|---|
| 3,304,697 A | 2/1967 | Ramsey |
| 3,304,741 A | 2/1967 | Weller |
| 3,438,218 A | 4/1969 | O'Neil |
| 3,540,189 A | 11/1970 | Siewers et al. |
| 4,187,695 A | 2/1980 | Schumacher |
| 4,280,337 A | 7/1981 | Kemp |
| 4,410,503 A | 10/1983 | van Nassau et al. |
| 4,456,535 A | 6/1984 | Zuidam et al. |
| 4,559,210 A | 12/1985 | Diemer et al. |
| 4,594,131 A | 6/1986 | Maier |
| 4,689,156 A | 8/1987 | Zibrida |
| 5,001,908 A | 3/1991 | Mayer |
| 5,086,621 A | 2/1992 | Starner et al. |
| 5,165,248 A | 11/1992 | Sishtla |
| 5,182,919 A | 2/1993 | Fujiwara |
| 5,321,956 A | 6/1994 | Kemp et al. |
| 5,407,655 A | 4/1995 | Sarritzu |
| 6,755,029 B2 * | 6/2004 | Bertrand et al. .............. 62/84 |
| 2004/0177644 A1 * | 9/2004 | Masterson .................... 62/84 |

OTHER PUBLICATIONS

IIAR (International Institute of Ammonia Refrigeration:; "Oil Draining Guidelines"; Guidelines—Aug. 1996; all pages; Arlington, VA, US.

* cited by examiner

METHOD AND APPARATUS FOR SEPARATING AND NEUTRALIZING AMMONIA

CROSS REFERENCE TO RELATED APPLICATIONS

This application is a continuation-in-part and therefore claims priority from U.S. application Ser. No. 10/338,504 filed on Jan. 8, 2003 now U.S. Pat. No. 6,755,029, which is in turn claims priority from U.S. provisional application 60/346,549, filed on Jan. 8, 2002. This application relates to a method and apparatus for isolating ammonia from a waste oil mixture and providing for the ammonia to be neutralized. The entire disclosure contained in U.S. application Ser. No. 10/338,504 and U.S. provisional application 60/346,549, including the attachments thereto, are incorporated herein by reference.

BACKGROUND OF THE INVENTION

1. Field of the Invention

Ammonia ($NH_3$) is a commonly used chemical prevalent in many industrial processes throughout the world. Ammonia may also be naturally occurring and is familiar to most of us as a mild irritant in small doses. In large concentrations, ammonia can be quite hazardous and, accordingly, ventilation and other safety precautions must be undertaken when working near ammonia. At normal temperatures and pressures, ammonia is a colorless gas made up of one part nitrogen to three parts hydrogen. Ammonia is lighter than air and has a sharp, pungent odor that serves as a warning of its presence. Although ammonia is a toxic gas, it is not a cumulative poison. Accordingly, removal from the source serves as the best protection. Ammonia is highly soluble in water and forms a solution known as ammonium hydroxide ($NH_4OH$) or aqua ammonia which is commonly used as a household cleanser.

One industrial application that has historically made liberal use of ammonia is commercial and industrial refrigeration systems. For such a refrigeration system, anhydrous ammonia is typically used. Anhydrous ammonia is the liquid form of pure ammonia gas, and is technically water-free. Most refrigeration experts consider industrial grade anhydrous ammonia to be the most economical and efficient heat transfer medium for industrial refrigeration processes.

In an industrial refrigeration system, compressors, piping, and vessels containing anhydrous ammonia are generally prevalent throughout the plant. Such a refrigeration system will generally also feature lubricating oils which are inserted into the compressor to keep the compressor lubricated. Invariably, some of the oil or other lubricant will migrate throughout the system, mixing with the anhydrous ammonia to coat the piping system. Since the oil will serve as an insulator or retardant to heat transfer, a high prevalence of waste oil in a refrigeration system will compromise efficiency of the refrigeration process. In order to prevent deterioration of the refrigeration function, accumulations of waste lubricating oil will need to be purged from the system. Most commercial and industrial refrigeration units will include one or more ports located at a lower level in the piping system and arranged such that lubricating oil will accumulate there to be drained from the pipes for collection and/or discarding.

In the United States, the International Institute of Ammonia Refrigeration (IIAR) is generally recognized as the leading authority on issues related to the operation and maintenance of industrial refrigeration systems utilizing ammonia. The IIAR has set forth various publications detailing proper practices for the operation of ammonia refrigeration systems as well as safety guidelines. Among the most pertinent guides set forth, Bulletin No. R1 (1983) provides a comprehensive analysis of the use of anhydrous ammonia in a refrigeration system. The IIAR has also set forth specific oil draining guidelines which are to be used in removing waste oil from an ammonia refrigeration system. (See the August 1996 IIAR Oil Draining Guidelines.) The guidelines note that draining oil from an ammonia refrigeration system is a potentially dangerous process and should only be performed by properly trained personnel.

In order to remove used lubricating oil from an industrial refrigeration unit, the typical procedure employed is for an employee to use the refrigeration system pressure if it is positive, or otherwise raise the pressure to a positive value above atmospheric pressure. An OSHA-approved ammonia hose should be screwed into the oil drain valve port. The present inventor has found that this current method is greatly improved, if the drain line also includes a sight flow indicator such as, for example, Model 700 manufactured by Anderson Midwest. Such an indicator enables the employee performing the oil removal to see when all the oil is removed and liquid ammonia is passing the sight glass. At that point, the employee quickly closes the valve when it is discovered that all the oil has been drained.

A bucket is placed under the oil drain valve port before the valved is opened, and the oil will flow into the bucket for disposal. In the alternative, hand pumps or mechanical pumps may also be used. Even when a pump is used, the waste oil is still typically removed into a bucket or other open container for removal by an employee. Since the waste oil has been in contact with ammonia, invariably the waste material removed will be a mixture of oil with entrained ammonia.

Under the IIAR guidelines, recognition of the inherent safety risks of removal of the oil-ammonia mix requires that an employee proceed with goggles, gloves and face shield before opening the valve port. In addition, the personnel in charge should check the ventilation fan in the area where the oil is being drained and only perform oil removal when appropriate ventilation is available. As the mixture is released, ammonia will be noticed in the ambient air along with the undesirable environmental effects. The maintenance personnel should always be in a position on the up-draft side of the oil drain bucket for this reason. The IIAR guidelines also state that the personnel should remain in position at the oil pot and keep a vigilant watch during the draining process until such time as the valve has been properly repositioned. Of course, for the personnel involved, the foul smell of ammonia will be prevalent. Since many waste removal ports are located within proximity to other industrial systems or personnel stations, oil draining is sometimes not performed as regularly as it should be. Of course, this leads to the inevitable compromising of the refrigeration system efficiency.

What is needed in the art is a means by which the waste oil can be effectively separated from the ammonia and the ammonia neutralized such as to prevent the undesirable side effects associated with draining waste oil from a commercial refrigeration unit that utilizes ammonia.

2. Description of the Related Art

Since ammonia-based refrigeration systems are old in the art, patents related to the composition of such a system are long expired. Many old patents also disclose systems or mechanisms for removing lubricating oil from a refrigeration system. One of the older patents which is also typical of standard commercial refrigeration oil separation can be found in U.S. Pat. No. 1,836,318 by N. H. Gay. In that refrigeration system, the oil separator noted by numeral 26 in FIG. 1 is typical. Other patents of note include U.S. Pat. No. 3,304,697 by Ramsey wherein a centrifugal separator is disclosed for separating the gaseous and non-gaseous components of a fluid stream including a collection pump and dividing means. U.S. Pat. No. 3,304,741 by Weller also discloses an oil separation system for a refrigeration system wherein an oil separator is positioned at a lower level with respect to a refrigeration system, and comprises an oil sump for gravity flow of oil into the compartment. U.S. Pat. No. 3,438,218 by O'Neil features a standard oil separation system wherein separated oil may be returned to the system.

U.S. Pat. No. 5,407,355 by Sarritzu claims a process of recovery of ammonia from a liquid waste stream. The process consists of reacting the stream with pure carbon dioxide or a gaseous mixture rich in carbon dioxide and then reacting the resulting mix with calcium chloride such as to cause calcium carbonate to undergo thermal decomposition. The thermal decomposition step is carried out preferably not lower than 850° C. Accordingly, the system has little utility for use in connection with a commercial refrigeration system.

U.S. Pat. No. 5,001,908 by Mayer discloses an oil separator for a refrigeration system wherein oil is separated from vaporized refrigerant leaving the high pressure discharge side of the compressor. Mayer states that in the preferred embodiment, oil is removed from the incoming refrigerant vapor in two successive stages, a centrifugal stage and a coalescing filter stage. While novel in many respects, this system does not address how to deal with entrained ammonia prevalent in a waste lubricating oil in a refrigeration system.

The prior art also features an assortment of patents directed to oil recovery systems for centrifugal refrigeration equipment or chillers including U.S. Pat. No. 5,165,248 by Sishtla and U.S. Pat. No. 5,182,919 by Fujiwara.

Perhaps the closest prior art system found is U.S. Pat. No. 4,280,337 by Kemp. Kemp discloses a means for separating oil from an ammonia-based refrigerant for potential reuse. The Kemp system includes an improved oil separation tank having upper and lower zones connected to the bottom of a surge means. A first conduit is included for draining settled out oil from the bottom of the surge means into the oil separation tank while a second conduit conducts oil from the lower zone of the oil separation tank to the suction intake of the compressor. This is best illustrated in FIG. 1 of the patent. However, Kemp is directed essentially to oil recovery and does not address the problem of neutralizing ammonia for improved safety in the oil separation process.

U.S. Pat. No. 4,559,210 by Diemer et al. is a multi-stage washing operation for the removal of ammonia from a gas stream. The method includes the steps of washing out ammonia from gas with a liquid enriched with ammonia in an ammonia washer followed with a washing with ammonia-free water at a second wash stage. A partial stream of waste water is then divided from the remainder and the partial stream is treated by the addition of sulphuric acid before being reintroduced into the final wash stage.

U.S. Pat. No. 4,689,156 to Zibrida involves removing ammonia from waste water by treating the waste water with an alkaline reagent consisting of lime and caustics sufficient to raise the pH to a value of at least 12.4. At that point, the waste water is subjected to a gas stripping exercise, said stripping being controlled to maintain the free ammonia equivalents of the waste water to at least 12.4 and acidifying the stripped waste water to lower the unionized ammonia content to less than 0.05 ppm $NH_3(N)$.

The prior art also includes a number of patents directed to processes for removing ammonia from a waste stream that are tangentially relevant to the present invention. For example, U.S. Pat. No. 3,540,189 by Siewers et al. is directed to a process for removing ammonia which has been formed during the de-gasification of coal in a coke oven in order to prevent the gas pipes from becoming corroded and in order to avoid formation of oxides in the smoke. U.S. Pat. No. 4,410,503 by van Nassau et al. involves a process for removing urea, ammonia and carbon dioxide from an aqueous solution. The method involves feeding a urea containing process condensate, relatively poor in ammonia, into an upper portion of a reaction chamber where it is heated by means of steam fed into the bottom of the column. The temperature and pressure in the column is maintained such that urea is decomposed therein into ammonia and carbon dioxide. The steam serves not only as a heating agent, but also as a stripping agent.

U.S. Pat. No. 4,456,535 by Zuidam et al. is a process for removing urea, ammonia and carbon dioxide from an aqueous solution by hydrolysis of urea and desorption of the ammonia and carbon dioxide. The solution is passed into the top portion of a column at a pressure of between 10 and 30 bar and is caused to flow downward countercurrent to an upward gas stream. The patent states that the top of the reaction column should be maintained at a temperature of between 170° and 220° C. and the bottom of the column should be maintained at a temperature of between 180° and 230° C.

In general, a review of pre-existing methods and technology finds considerable prior art directed to both the creation and elimination of ammonia in specific circumstances. The prior art also shows numerous uses and arrangements of ammonia-based refrigeration systems. However, none of the prior art is directed to the issue of neutralizing entrained ammonia in a stream of waste lubricating oil leaving a commercial refrigeration system such as to eliminate the attendant safety risks associated with the task.

SUMMARY OF THE INVENTION

The present invention is a method and apparatus for isolating ammonia from an oil mixture and providing for the ammonia to be neutralized. The apparatus includes a receiving tank, a treatment tank, a pump, a heat exchanger, a venturi, requisite valving and gauging, means of adding a neutralizer, and a recirculating system associated with the treatment tank and having two branches, one of which also draws off of the receiving tank. The receiving tank is a closed rigid structure for receiving an ammonia-entrained oil supply from the refrigeration system. The treatment tank holds an aqueous solution which is pumped through the recirculating system. A first branch of the recirculating system includes a venturi which creates a low pressure vacuum location within the fluid flow. A line plumbed from this low pressure location in the venturi to the receiving tank draws the receiving tank down to a pressure below atmospheric pressure and also draws off ammonia gas from the receiving tank. By being at a pressure below atmospheric pressure, the receiving tank can be connected to a section of the industrial refrigeration system which is also below atmospheric pressure and still draw contaminating oil from the refrigeration system. The lower pressure increases the evaporation rate of liquid ammonia drawn into the receiving tank.

As just noted, the ammonia gas is drawn from the receiving tank to the venturi. There it enters the flow of the aqueous solution meant to neutralize it and is thoroughly mixed in the piping section immediately following the venturi. Downstream of the venturi, but before this piping branch empties into the treatment tank, additional neutralizer may be introduced to the flow. A second branch of the recirculating system runs to a heat exchanger fully contained within the receiving tank and then exits from the receiving tank to return to the treatment tank where it empties back into the reservoir of aqueous solution within the treatment tank. The exits of the two branches into the treatment tank are in close proximity to each other to increase the mixing of the portion of aqueous solution just having ammonia and neutralizer added.

The heat exchanger serves multiple purposes. The chemical reaction of neutralizing the ammonia releases substantial amounts of heat. Passing the aqueous solution through the heat exchanger in the receiving tank transfers this heat to the oil and ammonia in the receiving tank. Increasing the temperature of the oil assists in evaporating the entrained ammonia out of the oil. The gaseous ammonia is then drawn off to the venturi. Of course, liquid ammonia entering the receiving tank is also evaporated more quickly by the added heat. In addition to transferring heat to the receiving tank the recirculating solution removes heat from the treatment tank, so that it does not reach excessive temperatures. To that end, evaporation of a liquid to a gas can absorb a substantial amount of heat.

Finally, a by-pass is provided wherein flow may be directed in a foreshortened path directly back into the treating tank. When the temperature of the receiving tank exceeds a predetermined temperature, the coil in the receiving tank should be bypassed. This allows reducing or eliminating flow through either the heat exchanger or the venturi while maintaining mixing action in the treatment tank. Valving is also provided wherein the pump may be used to discharge the contents of the treatment tank to an appropriate receptacle. Likewise, a drain in the receiving tank enables the removal of waste oil. Also, the receiving tank is mounted on a saddle which elevates it enough to accommodate a bucket for gravity draining of waste oil.

The treatment tank holds an aqueous media and the system provides for the controlled introduction of an acid into either the treatment tank or the transfer piping for treatment and neutralization of the mixture. The apparatus further includes a means for pumping the resultant mixture of the aqueous media, acid and released ammonia from the treatment tank, circulating said mixture through a closed system of recirculation piping for return to the treatment tank.

A primary objective of this invention is to provide a method and apparatus for effectively and efficiently removing entrained ammonia from the waste lubricating oil from a commercial refrigeration system.

Another objective of the present invention is to set forth an apparatus and method for neutralizing liberated ammonia from waste oil that is safer than prior art methods and more sensitive to the environmental constraints of the ambient plant.

Another objective of the present invention is to provide for an ammonia removal and neutralization system that is economical to operate and build. Furthermore, another objective of the present invention is to provide an apparatus which may be oriented on a portable frame for easy introduction where needed in the refrigeration system and for ease in relocation upon completion of the task.

A further objective of the present invention is to provide an ammonia removal and neutralization system capable of removing contaminant oil from an industrial refrigeration system at a location in the system operating below atmospheric pressure.

Yet another objective of the present invention is to use the heat generated by the process of neutralizing the ammonia in one section of the system to evaporate the ammonia in another section of the system. Additionally, this transfer of heat helps control the temperature in the reaction section of the system.

As discussed above, the method and device of the present invention overcomes the disadvantages inherent in prior art methods and devices. In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purposes of description and should not be regarded as limiting.

Accordingly, those skilled in the art will appreciate that the conception upon which this invention is based may readily be utilized as the basis for other structures, methods and systems for carrying out the purposes of the present invention. It is important, therefore, that the claims be regarded as including such equivalent constructions insofar as they do not depart from the spirit of the present invention.

Furthermore, the purpose of the foregoing Abstract is to enable the U.S. Patent and Trademark Office and the public generally, and especially including the practitioners in the art who are not familiar with patent or legal terms or phraseology, to determine quickly from a cursory inspection, the nature and essence of the technical disclosure of the application. The Abstract is neither intended to define the invention of the application nor is it intended to be limiting to the scope of the invention in any way.

BRIEF DESCRIPTION OF THE DRAWINGS

Additional utility and features of this invention will become more fully apparent to those skilled in the art by reference to the following drawings, wherein all components are designated by like numerals and described more specifically.

DETAILED DESCRIPTION OF THE PREFERRED EMBODIMENT

Figure 1:
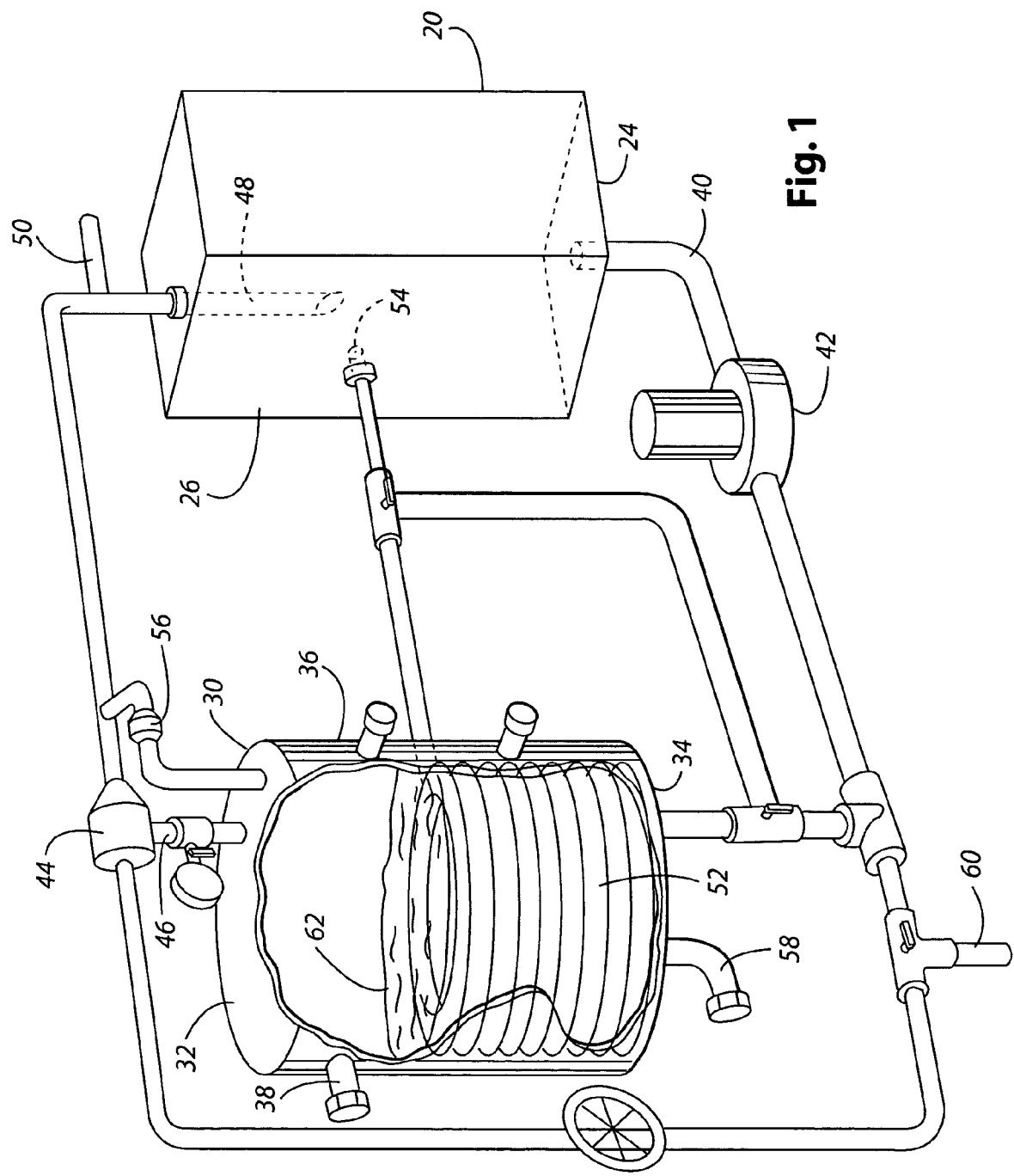
FIG. 1 is a perspective view of a first embodiment of the apparatus of the present invention with a cutaway view of the receiving tank.

The present invention is for a method of safely isolating waste ammonia from an oil/ammonia waste mix such as that encountered in a commercial and industrial refrigeration system. Referring to FIG. 1, the apparatus includes two vessels, specifically, a rectangular treatment tank 20 having a top 22, a bottom 24, and sides 26 and a cylindrical receiving tank 30, having a top 32, a bottom 34, and a side 36.

The treatment tank 20 contains an aqueous solution for neutralizing ammonia. This solution is circulated through plumbing 40 which draws the solution from the bottom 24 of the treatment tank 20 and which has multiple flow paths. A pump 42 circulates the fluid through the plumbing which has at one location a venturi 44 located in line with the plumbing in one flow path which then proceeds on to return circulating the solution to the top 22 of the treatment tank 20. The venturi 44 functions to create a suction, and a low pressure line 46 is connected at one end to a low pressure port in the venturi 44 and at its other end to the top 32 of the receiving tank 30.

The low pressure line 46 draws gases out of the receiving tank 30 and induces a negative gauge pressure in it. A suction regulator and check valve incorporated into low pressure line 46 control the negative gauge pressures attained in receiving tank 30. From the side 36 of the receiving tank 30, an inlet port 38 extends. The inlet port 38 is connected to the industrial refrigeration system to draw contaminating oil out of locations in the refrigeration system where the oil collects. The negative gauge pressure of the receiving tank 30 allows the inlet port 38 to be connected to locations in the refrigeration system that are below atmospheric pressure and still draw the contaminating oil from the system. This oil will have ammonia entrained in it as it enters the receiving tank 30. The low pressure in the receiving tank 30 will induce the ammonia to leave the oil and evaporate to a gas state.

Once the ammonia has transformed into a gas, it is drawn from the receiving tank 30 through the low pressure line 46 to the venturi 44, where it enters into the flow of the aqueous neutralizing solution through the system toward the upper discharge 48 into the treatment tank 20. In between the venturi 44 and the upper discharge 48, is located means 50 for adding a neutralizing agent to the flow of the aqueous solution and ammonia. In the preferred embodiment, the neutralizing agent is carbon dioxide gas.

In addition to the plumbing circuit just described, there are other possible flow paths for the aqueous solution circulated by the pump 42. One path splits off and flows to a heat exchanger 52 located within the receiving tank 30. From the heat exchanger 52, the solution returns to the treatment tank 20 where it is discharged into the tank at a lower discharge 54. A significant amount of heat may be released by the process of neutralizing the ammonia in the treatment tank 20. The flow path from the bottom 24 of the treatment tank 20 through the pump 42 to the heat exchanger 52 and back to the treatment tank 20 at the lower discharge 54 serves to transfer some of this heat from the treatment tank 20 to the receiving tank 30. This transfer of heat increases the temperature of the receiving tank 30 and facilitates the evaporation of ammonia entrained in the waste oil. Also the temperature of the treatment tank 20 is regulated by this transfer of heat so that treatment tank's 20 temperature does not become excessive. The upper discharge 48 and lower discharge 54 are located in close proximity to each other to increase mixing within the treatment tank 20.

Another flow path within the plumbing system is similar to the one just explained. This one however, by-passes the heat exchanger 52 in the receiving tank 30 and rejoins the previous path before returning to the treatment tank 54 at the lower discharge 54. This path provides a means of mixing the solution in the treatment tank 20 without passing the solution through the heat exchanger 52 or the venturi 44, although either of those other flow paths may be used at the same time.

While the neutralizing reaction is not intended to occur in receiving tank 30, receiving tank 30 is a closed vessel and the ability to introduce heat to it may lead to elevated pressures therein. If the pressure in receiving tank 30 exceeds acceptable limits, pipeline 56, which incorporates a safety relief valve, allows high pressure gases to discharge from the receiving tank 30. This prevents overpressurizing receiving tank 30 to avoid a dangerous situation.

Once the entrained ammonia is separated and neutralized, residual waste oil 62 is left in the receiving tank 30. This waste oil 62 may be drained out of the receiving tank 30 via drain 58 which incorporates a check valve to facilitate the draining of the waste oil 62 by controlling the pressure. Likewise, when it is desired to dispose of the solution it may be discharged through the plumbing system at an outlet 60. Valves and gauges provide means of controlling the system, while site glasses allow the tanks to be visually monitored.

From a reading of the above, one with ordinary skill in the art should be able to devise variations to the inventive features. For example, various gauges, control valves, and similar known devices may be added to the invention to automate parts of the system, or to allow for better monitoring of the system. These and other such variations fall within the spirit and scope of the present invention.

Figure 2:
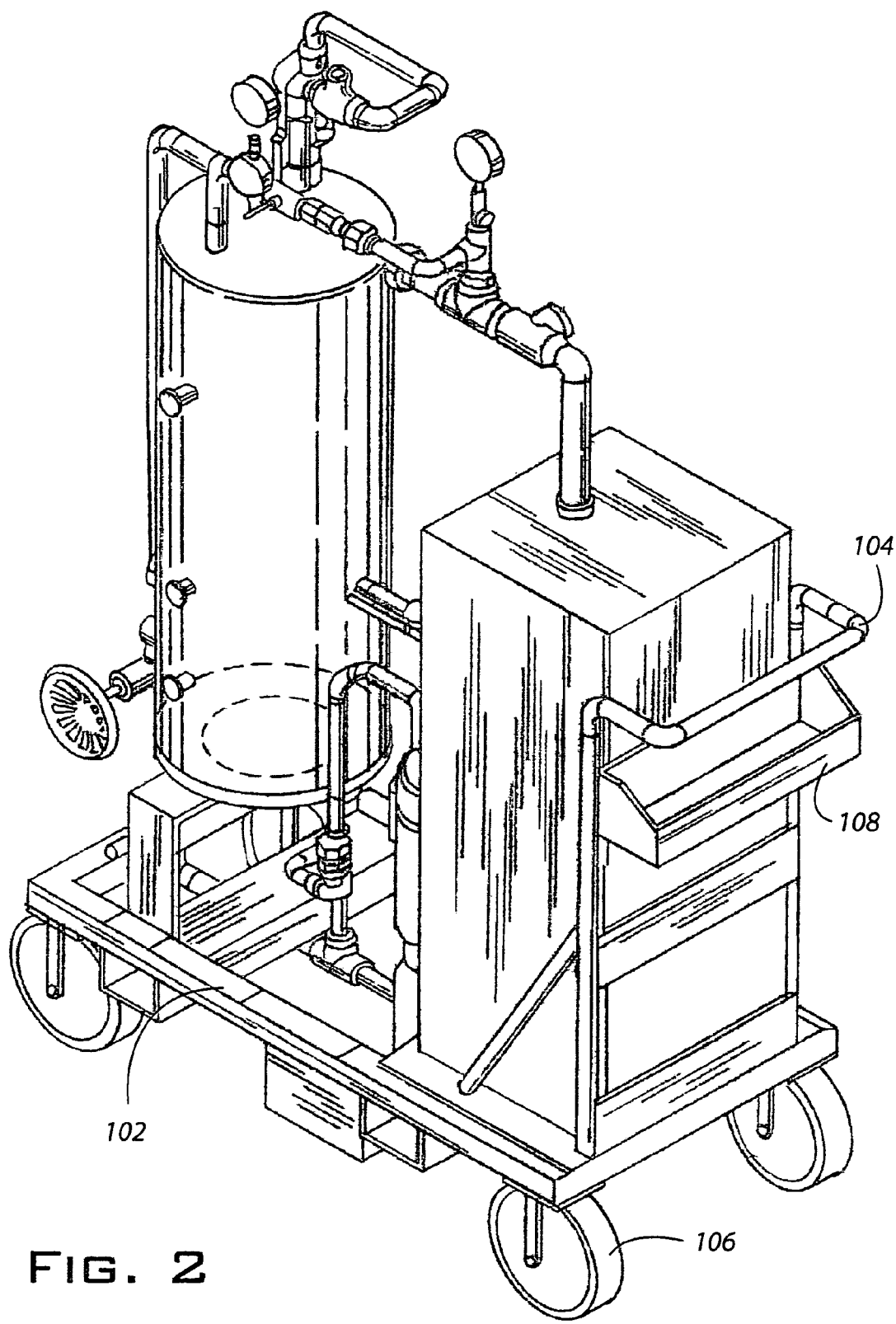
FIG. 2 is a perspective view of a second embodiment of the present invention showing the ammonia separator and neutralizer arranged as a portable unit on a wheeled frame.
Figure 3:
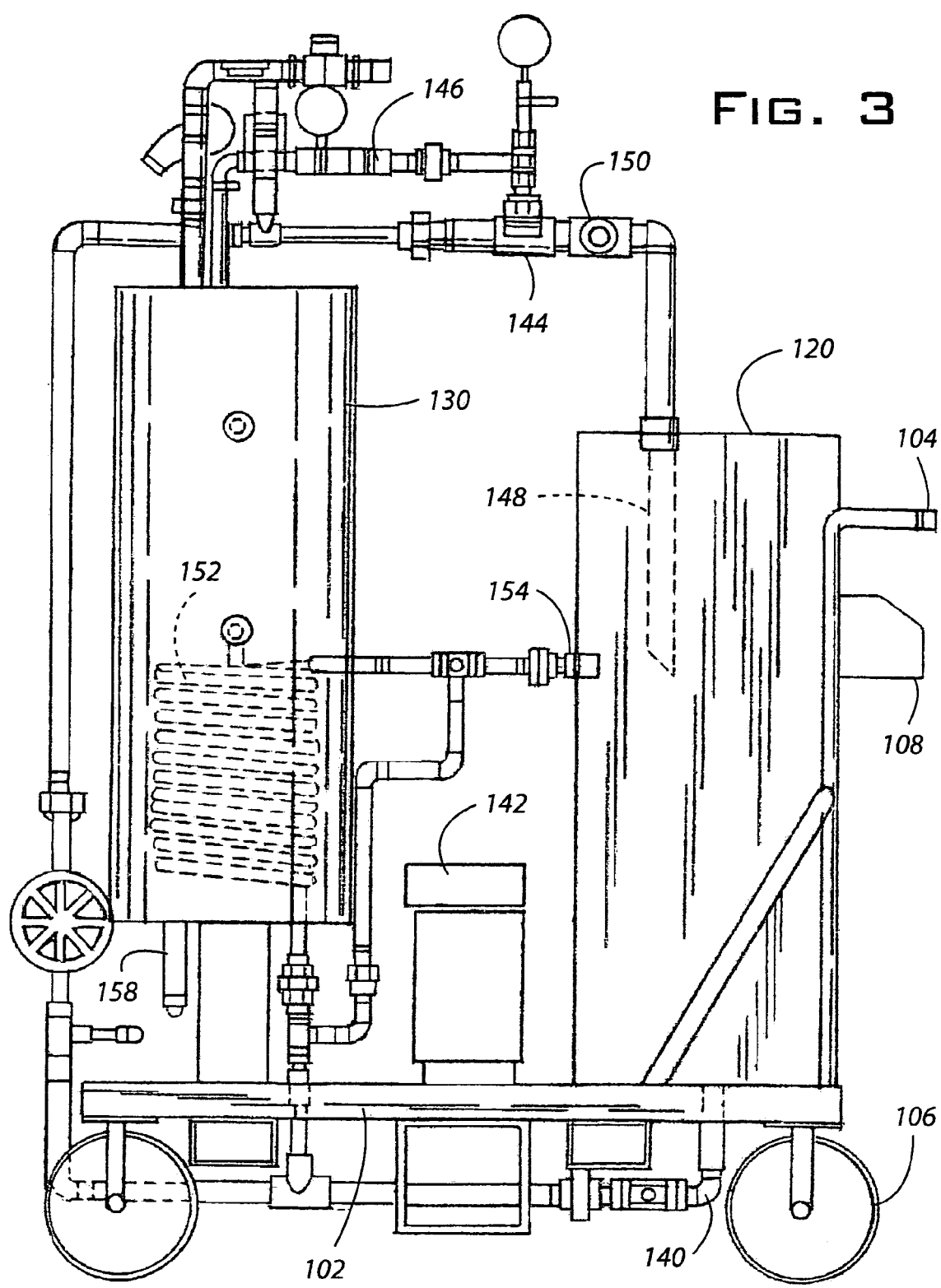
FIG. 3 is a side view of a second embodiment of the present invention showing the ammonia separator and neutralizer arranged as a portable unit on a wheeled frame.

FIG. 2 and FIG. 3 show an alternative embodiment of the present invention wherein the ammonia separator and neutralizer is disposed upon a wheeled frame in order to make the unit portable. Reference will be made mostly to FIG. 3 where equivalent elements are labeled with like numbers as in FIG. 1, but being preceded by a 1. Not all numbers from FIG. 1 will have a corresponding number in. FIG. 3. Elements fundamental to the second embodiment will have new numbering.

As shown in the drawing, a horizontal frame 102 supports the treatment tank 120 and receiving tank 130 and associated equipment. The frame 102 is optimally constructed of heavy gauge steel although other materials may also be used. Considering the fact that the frame may be called upon to support considerable weight at times, the frame 102 should be durable enough to withstand weight loads of at least 500 pounds. In this preferred embodiment, the unit includes a handle 104 which rises vertically from frame 102 at one end of the frame. Handle 104 is likewise constructed of steel or a suitable equivalent. FIG. 3 shows the handle arranged as a pull bar which is optimal although other handle mechanisms may be employed.

Frame 102 is supported by four wheels 106 as shown in FIG. 3. The wheels may be any suitable commercially available wheel. As shown in FIG. 3, a 6 inch diameter wheel is optimal for this use. In order to navigate the portable unit more easily, it is preferable that two of the wheels 106 be caster-type wheels such that they may be moved in any direction with ease. Preferably, the two wheels oriented closest to handle 104 should be caster-type wheels while the two wheels 106 at the opposite end of the frame 102 are permanently oriented in the direction of the frame rather than caster-type wheels. Also, a means of lifting the apparatus with a fork lift is provided.

As further shown in FIG. 3, frame 102 provides support for treatment tank 120 and receiving tank 130. Treatment tank 120 is preferably constructed of steel and is shown to be rectangular in FIG. 3 while the receiving tank 130 is cylindrical. These shapes are optional and the arrangement of shapes shown in FIG. 3 is only employed to create a unit in which the shapes of the two primary tanks are different in order to alert the operator as to which tank is which. It is to be appreciated that other shapes and sizes of the two primary tanks may be utilized. Receiving tank 130 is depicted with a flat top but may have a concave top to reduce its needed thickness while still meeting applicable codes for the pressure differentials at which the receiving tank 130 will operate.

Treatment tank 120 is characterized by a recirculating line 140 which includes an in-line pump 142 to draw liquid material from the base of treatment tank 120 through line 140 and then pass it through a venturi 144 before it returns to the treatment tank 120. The fluid passing through the venturi 144 is used to create a suction which draws gases from the receiving tank 130 via low pressure line 146. These gases mix with the fluid being pumped through the system which is reintroduced into treatment tank 120 at upper discharge 148. In addition to gases from the receiving tank, a neutralizing agent, for neutralizing the ammonia, may be added to the flow at 150.

Drawing gases from the receiving tank 130 via low pressure line 146 reduces the pressure in receiving tank 130 to below atmospheric pressure. This allows the receiving tank 130 to remove waste oil from a refrigeration system when the receiving tank 130 is connected to it even when the refrigeration system is operating at below atmospheric pressure in the location where the connection is made. The reduced pressure in receiving tank 130 also facilitates the transition of liquid ammonia to gaseous ammonia. The ammonia gas is then drawn off to be neutralized via low pressure line 146.

The fluid being moved by pump 142 may flow along alternative routes within the neutralizing system. It may be directed through a heat exchanging coil 152 located within receiving tank 130 then returned to the treatment tank at the lower discharge 154. This flow pattern is capable of transferring the heat produced by the neutralizing reaction from the treatment tank 120 to the receiving tank 130. This prevents the treatment tank 120 from reaching excessive temperatures while increasing the temperature of the receiving tank to assist the evaporation of any liquid ammonia present in the receiving tank 130. The lower discharge 154 is in proximity to the upper discharge 148 to facilitate mixing of the aqueous solution. An additional flow path is provided to simply mix the solution. This bypasses the heat transfer coil 152 and directly reenters the treatment tank at the lower discharge 154.

Optimally, the recirculating paths may include gauges, valves, regulators or other control devices as necessary. Preferably, pump 142 may be isolated by the use of valves for pump maintenance or removal. Site glasses may be utilized in both receiving tank 130 and treatment tank 120.

Functionally, the portable unit performs the same separation and neutralization functions as the stationary unit described in FIG. 1. The primary additional utility for the portable configuration is the ease of moving the apparatus into place and removing it upon completion. In addition, a plant with multiple refrigeration lines could benefit from an apparatus that can be moved from line to line when maintenance is required. Additional utility may be added to the portable unit by adding features such as tool tray 108 attached to the vertical section of handle 104 as seen in FIG. 2 and FIG. 3.

Another embodiment which may be employed is to orient the receiving tank 130 and treatment tank 120 in a stacked configuration on the wheeled frame 102. In such a construction, the receiving tank 130 and treatment tank 120 will be in close physical relationship to each other, and accordingly, the contents of the treatment tank will be heated, in part, by heat transfer from the treatment tank below due to their proximity. The associated piping and other equipment would be essentially unchanged in this configuration.

I claim:

1. An apparatus for separating and neutralizing entrained ammonia from an oil stream being removed from a refrigeration system comprised of:
    a) a treatment tank for holding an aqueous media;
    b) a closed receiving tank for receiving an ammonia-entrained oil supply from said refrigeration system;
    c) a circulation pipeline having a first end and a second end with said first end of said circulation pipeline being oriented in the bottom of said treatment tank and in fluid communication therewith and with said second end being oriented in the top of said treatment tank and in fluid communication therewith;
    d) means for pumping said aqueous media through said circulation pipeline, located intermediate said first end and said second end of said circulation pipeline;
    e) means for drawing gases from said receiving tank and introducing said gases to said aqueous solution;
    f) means for controllably introducing a neutralizing agent into said aqueous solution;
    g) means for connecting said receiving tank to said refrigeration system;
    h) means for draining said receiving tank, and
    i) means for discharging said aqueous mixture.

2. The apparatus of claim 1 wherein, said means for drawing gases from said receiving tank and introducing said gases to said aqueous solution comprises;
    a venturi located in said circulation pipeline intermediate said means for pumping and said second end of said circulation pipeline and a low pressure pipeline having one end in communication with said venturi and the other end in communication with said receiving tank.

3. The apparatus of claim 2 further comprising;
    a) an adjustable valve in said recirculating pipeline located intermediate of said means of pumping and said venturi, and
    b) a second pipeline branch having an initial start from said adjustable valve, passing into said receiving tank, connecting to a heat exchanger within said receiving tank, continuing therefrom to exit from said receiving tank to enter said treatment tank and discharge in proximity to said second end of the said recirculating pipeline.

4. The apparatus of claim 2 further comprising;
    a) an adjustable valve in said recirculating pipeline located intermediate of said means of pumping and said venturi, and
    b) a bypass pipeline having an initial start from said adjustable valve and returning to said treatment tank to discharge in proximity to said second end of said recirculating pipeline.

5. The apparatus of claim 4 wherein said receiving tank and treatment tank are oriented in a stacked configuration on said wheeled frame.

6. The apparatus of claim 1 wherein;
    said means for controllably introducing a neutralizing agent into said aqueous solution introduces it into said circulation pipeline intermediate of said means for drawing gases from said receiving tank and introducing said gases to said aqueous solution and said second end of said circulation pipeline.

7. The apparatus of claim 1 wherein said apparatus further includes an external source for heating said aqueous media.

8. The apparatus of claim 1 wherein said apparatus is constructed as a portable apparatus disposed upon a wheeled frame.

9. The apparatus of claim 1 wherein said neutralizer is carbon dioxide.

10. The apparatus of claim 1 wherein said neutralizer is muriatic acid.

11. The apparatus of claim 1 wherein said aqueous media is comprised of water.

12. A method of separating and neutralizing entrained ammonia from an oil stream being removed from a refrigeration system, comprising the steps of:
   a) removing the ammonia-entrained oil supply from said refrigeration system and placing said ammonia-entrained oil supply into a receiving tank;
   b) heating said receiving tank to above a temperature required to evaporate the entrained ammonia from said oil supply, whereupon said released gaseous ammonia rises and enters a first end of a transfer pipeline extending from the top of said receiving tank and travels through said transfer pipeline into a treatment tank;
   c) mixing said released gaseous ammonia with an aqueous media in said treatment tank by orienting the second end of said transfer pipeline at or above the level of said aqueous media in said treatment tank;
   d) placing a neutralizing agent into said aqueous media; and
   e) pumping the mixture of said aqueous media, neutralizing agent and released ammonia from said treatment tank, circulating said mixture through a closed system of piping for return to said treatment tank.

13. The method of claim 12 wherein said receiving tank further includes an external source for heating the contents of said receiving tank.

14. The method of claim 12 wherein said receiving tank, treatment tank, transfer piping, recirculating piping and all associated equipment are disposed upon a wheeled frame.

15. The method of claim 14 wherein said receiving tank and treatment tank are oriented in a stacked configuration on said wheeled frame.

16. The method of claim 12 wherein said neutralizing agent is carbon dioxide.

17. The method of claim 12 wherein said neutralizing agent is muriatic acid.

18. The method of claim 12 wherein said aqueous media is comprised of water.

19. A method of separating and neutralizing entrained ammonia from an oil stream being removed from a refrigeration system, comprising the steps of:
   a) containing a quantity of aqueous solution in a treatment tank;
   b) pumping said aqueous solution through a first pipeline both originating and terminating in said treatment tank;
   c) drawing gases from a receiving tank, creating a pressure in said receiving tank lower than the pressure of said refrigeration system;
   d) connecting said receiving tank to said refrigeration system so that the lower pressure in said receiving tank removes said oil stream from said refrigeration system;
   e) further drawing ammonia gas from said receiving tank and introducing said ammonia gas into said aqueous solution; and
   f) adding a neutralizing agent to said aqueous solution as needed.

20. The method of claim 19 wherein;
   a venturi located in said first pipeline is used to draw off said gases and said ammonia gas from said receiving tank and to introduce said gases and said ammonia gas into said aqueous solution.

21. The method of claim 19 wherein; said neutralizing agent is added in said first pipeline.

22. The method of claim 19 wherein;
   an adjustable valve in said first pipeline allows said aqueous solution to flow through a second pipeline which connects to a heat exchanger within said receiving tank and then exits said receiving tank to enter and discharge into said treatment tank.

* * * * *